United States Patent
Park et al.

(10) Patent No.: US 8,187,736 B2
(45) Date of Patent: May 29, 2012

(54) COOLING SYSTEM FOR HYBRID VEHICLES

(75) Inventors: Min Woo Park, Daejeon (KR); Dae Woong Lee, Daejeon (KR); Hyung Joo Kim, Daejeon (KR); Il Guk Son, Daejeon (KR); Sung Je Lee, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 1519 days.

(21) Appl. No.: 11/670,055

(22) Filed: Feb. 1, 2007

(65) Prior Publication Data

US 2007/0175623 A1 Aug. 2, 2007

(30) Foreign Application Priority Data

Feb. 2, 2006 (KR) .................. 10-2006-0010044
Jul. 26, 2006 (KR) .................. 10-2006-0070197
Jan. 30, 2007 (KR) .................. 10-2007-0009289

(51) Int. Cl.
*H01M 10/50* (2006.01)
*B60H 1/00* (2006.01)
*B60K 11/00* (2006.01)

(52) U.S. Cl. .......... 429/62; 429/120; 165/202; 903/907; 903/903; 903/952; 180/68.1

(58) Field of Classification Search .............. 429/439, 429/440, 58, 61–62, 90–93, 96, 99–100, 429/112, 120–122, 129, 142, 149, 156, 163–164, 429/176–177, 186; 903/952, 903, 907; 180/68.1, 180/68.3, 229, 68.2; 165/202
See application file for complete search history.

(56) References Cited

U.S. PATENT DOCUMENTS

| 4,947,735 A * | 8/1990 | Guillemin | 454/141 |
| 6,828,755 B1 * | 12/2004 | Iverson et al. | 320/104 |
| 7,017,361 B2 | 3/2006 | Kwon | |

FOREIGN PATENT DOCUMENTS

| DE | 4106684 A1 * | 9/1992 |
| JP | 11195437 A * | 7/1999 |
| KR | 10-2003-0065254 | 3/2005 |

OTHER PUBLICATIONS

Machine Translation and Abstract in English of DE 4106684.*
Machine Translation and Abstract in English of JP 11-195437.*

* cited by examiner

*Primary Examiner* — Barbara Gilliam
*Assistant Examiner* — Claire L Roe
(74) *Attorney, Agent, or Firm* — Patent Law Group LLP; Carmen C. Cook

(57) ABSTRACT

A cooling system for hybrid vehicles is provided with a battery case with a battery storage room for receiving a battery, a motor control unit for controlling an electric motor and a DC-DC converter for converting a voltage of the battery. The cooling system includes a blower for drawing an air existing in a passenger compartment of a vehicle, an introduction duct through which the air is introduced into the battery storage room to cool the battery, a first supply duct through which the air is supplied from the battery storage room to the DC-DC converter to cool the latter, a second supply duct through which the air is supplied from the battery storage room to the motor control unit to cool the latter, and an air distributor means for distributing the air flowing out of the battery storage room to the first supply duct and the second supply duct.

10 Claims, 12 Drawing Sheets

COOLING SYSTEM FOR HYBRID VEHICLES

This application claims the benefit of Korean Patent Application No. 10-2006-0010044, filed on Feb. 2, 2006, Korean Patent Application No. 10-2006-0070197, filed on Jul. 26, 2006 and Korean Patent Application No. 10-2007-0009289, filed on Jan. 30, 2007, the disclosure of which is hereby incorporated by reference as if fully set forth herein.

FIELD OF THE INVENTION

The present invention pertains to a cooling system for hybrid vehicles and, more particularly, to a cooling system for hybrid vehicles capable of simultaneously cooling a battery, a motor control unit and a DC-DC converter all together by use of an air introduced.

BACKGROUND OF THE INVENTION

A hybrid vehicle, which refers to a motor vehicle equipped with an electric motor and an internal combustion engine in combination, is known to enjoy increased fuel economy and reduced upkeep costs and is an environmentally friendly vehicle that produces an extremely low level of exhaust emission, thus helping to reduce air pollution.

Such a hybrid vehicle includes a battery for supplying the electric motor with an electric power, a motor control unit for controlling the electric motor, a DC-DC converter for properly converting an electric voltage of the battery and a cooling system for cooling the battery. In particular, the cooling system is adapted to cool the battery that emits heat of a high temperature, thereby preventing any overheat of the battery and prolonging the life span thereof.

As one example of the cooling system, there is known an air-cooled cooling system that includes, as illustrated in FIG. 1, an intake duct 1 through which the air is drawn from a passenger compartment, an introduction duct 5 for leading the air thus drawn to a battery case 3 and an exhaust duct 7 through which the air in the battery case 3 is discharged to the outside.

The air-cooled cooling system is designed to draw the air from the passenger compartment and introduce the air thus drawn into the battery case 3. This enables the air introduced into the battery case 3 to cool the battery (not shown) situated within the battery case 3.

One drawback of such a conventional cooling system is that it is configured to cool nothing but the battery and has no ability to cool the motor control unit and the DC-DC converter. This poses a problem in that separate cooling devices need to be provided to cool the motor control unit and the DC-DC converter.

More importantly, the cooling devices for cooling the motor control unit and the DC-DC converter need to be installed independently of each other. This is problematic in that the number of components is increased as well and hence the cooling system becomes structurally complex with an attendant increase in production costs.

SUMMARY OF THE INVENTION

In view of the above-noted problems inherent in the prior art, it is therefore an object of the present invention to provide a cooling system for hybrid vehicles capable of simultaneously cooling a battery, a motor control unit and a DC-DC converter all together by use of a single unified cooling arrangement.

Another object of the present invention is to provide a cooling system for hybrid vehicles that can minimize the number of components required, while enjoying a simplified structure and reduced production costs.

In order to accomplish the above objects, the present invention provides a cooling system for hybrid vehicles including a battery case with a battery storage room for receiving a battery, a motor control unit for controlling an electric motor and a DC-DC converter for converting a voltage of the battery, comprising: a blower for drawing an air existing in a passenger compartment of a vehicle; an introduction duct through which the air drawn by the blower is introduced into the battery storage room to cool the battery; a first supply duct having an internal passageway through which the air flowing out of the battery storage room is supplied to the DC-DC converter to cool the DC-DC converter; a second supply duct having an internal passageway through which the air flowing out of the battery storage room is supplied to the motor control unit to cool the motor control unit; and an air distributor means for distributing the air flowing out of the battery storage room to the first supply duct and the second supply duct.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENT

Figure 1:
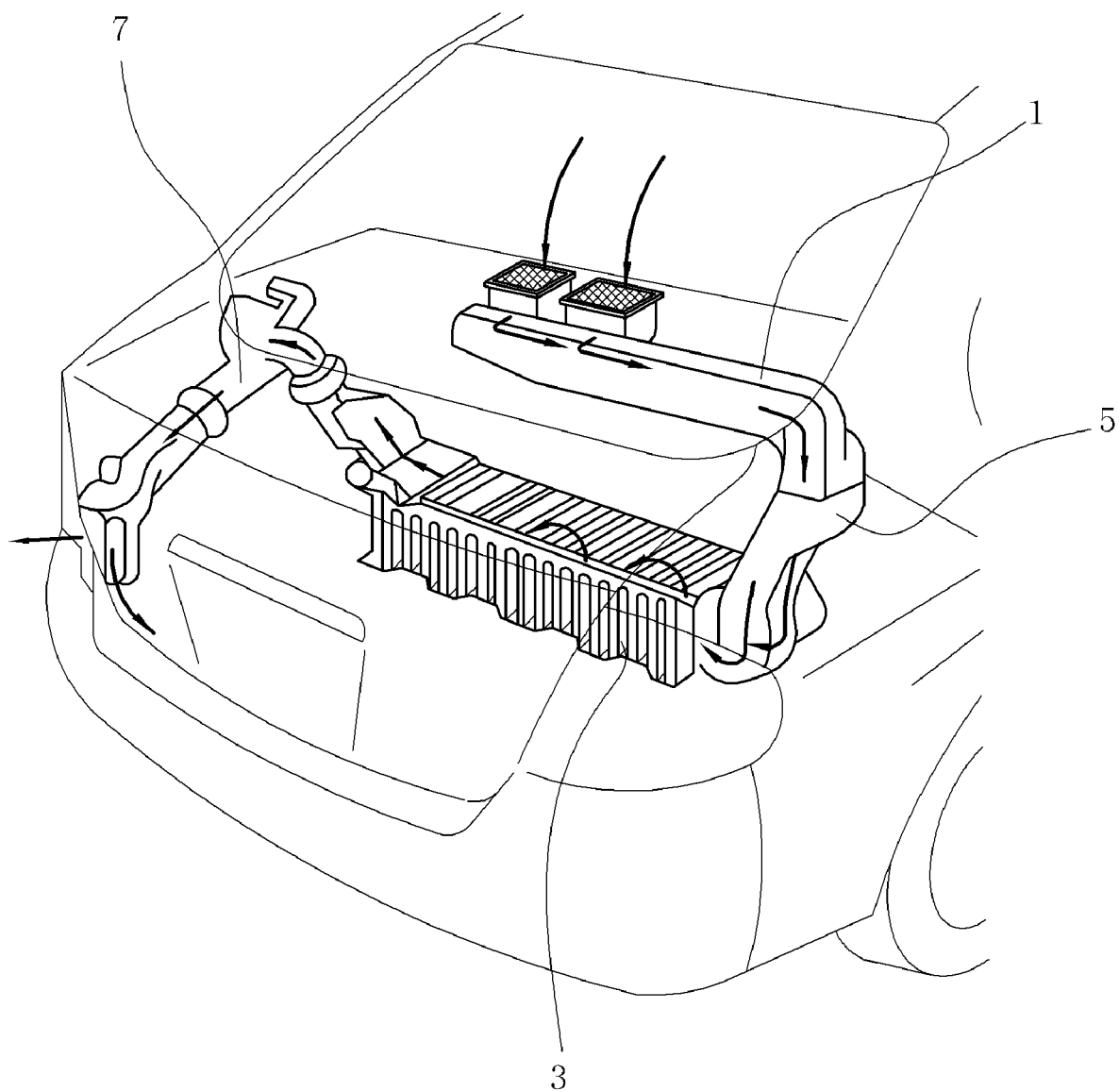
FIG. 1 is a perspective view showing a prior art cooling system for hybrid vehicles.

Hereinafter, a preferred embodiment of a cooling system for hybrid vehicles in accordance with the present invention will be described in detail with reference to the accompanying drawings. The same parts or components as those of the prior art cooling system will be designated and described with like reference numerals.

Figure 2:
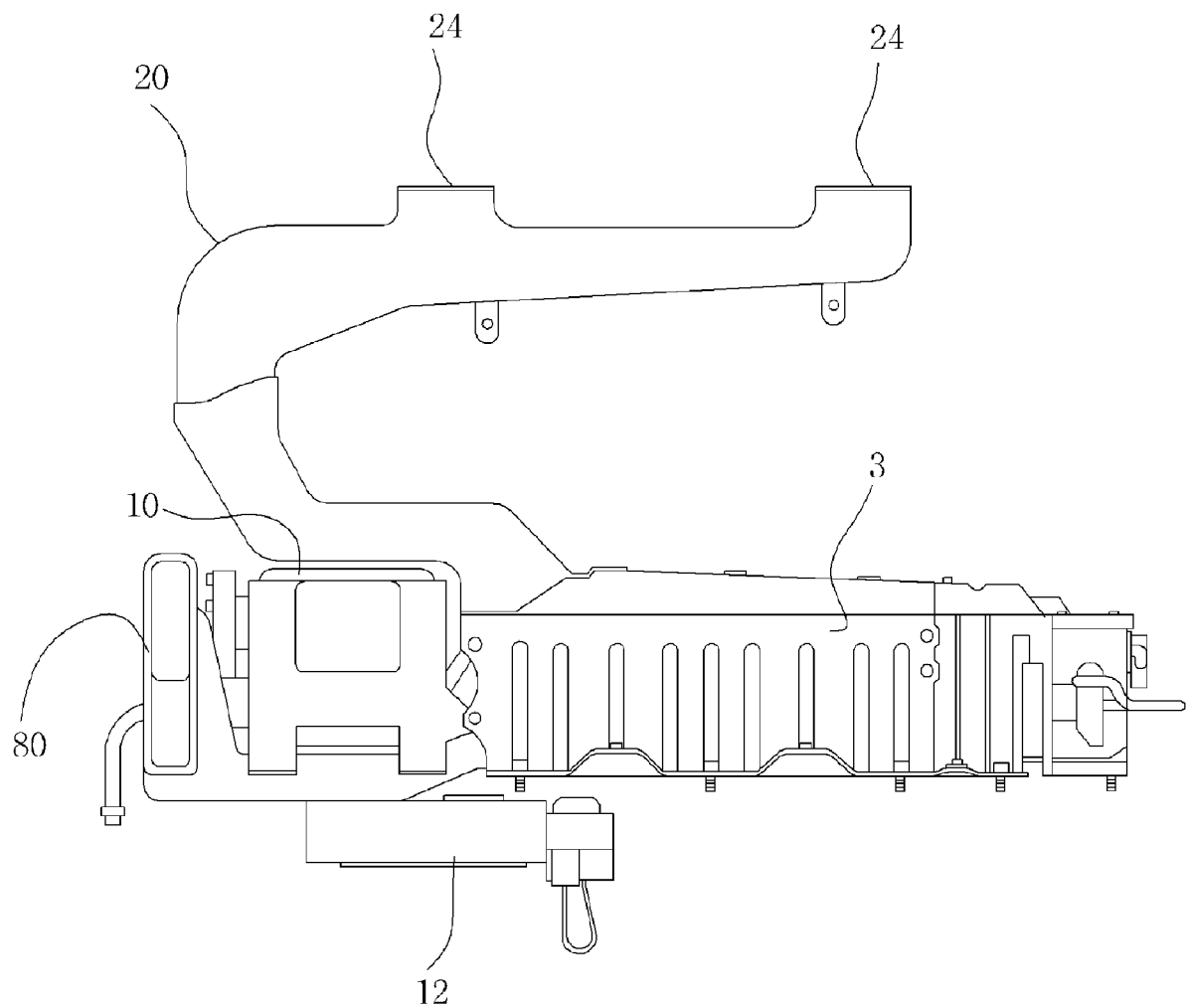
FIG. 2 is a front elevational view illustrating a cooling system for hybrid vehicles in accordance with the present invention.
Figure 3:
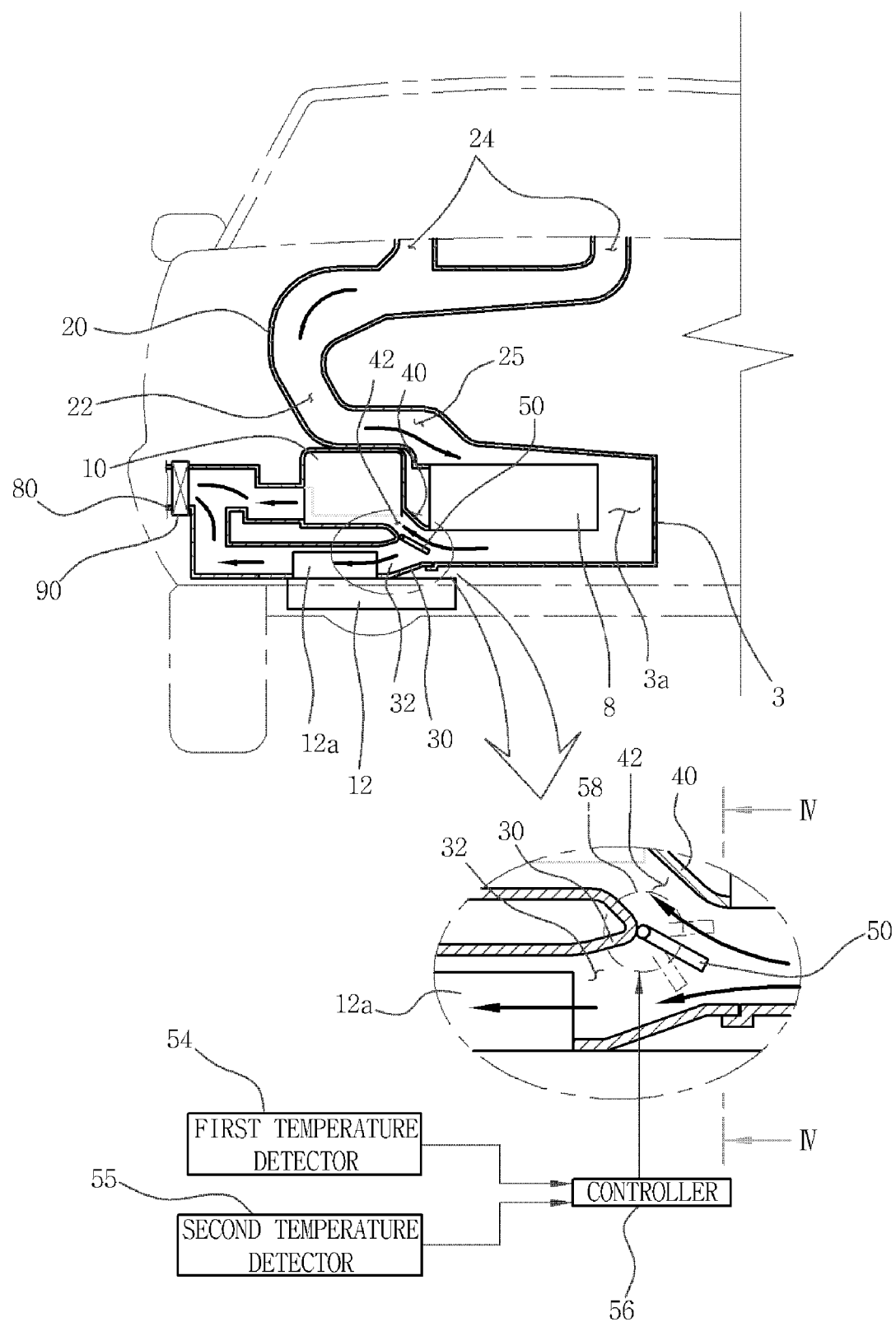
FIG. 3 is a sectional view illustrating, in more detail, the cooling system for hybrid vehicles in accordance with the present invention.

FIG. 2 is a front elevational view illustrating a cooling system for hybrid vehicles in accordance with the present invention and FIG. 3 is a sectional view illustrating, in more detail, the present cooling system for hybrid vehicles.

A brief description of a hybrid vehicle will precede the description of the cooling system for hybrid vehicles in accordance with the present invention.

As illustrated in FIGS. 2 and 3, the hybrid vehicle is provided with a battery case 3 having a battery storage room 3a formed therein. A battery 8 is received within the battery storage room 3a and is connected to an electric motor (not shown) to supply an electric power thereto.

The hybrid vehicle is further provided with a motor control unit 10 and a DC-DC converter 12. The motor control unit 10 serves to control the electric motor, whereas the DC-DC converter 12 functions to properly convert the voltage of the battery 8.

From now, the cooling system for hybrid vehicles in accordance with the present invention will be described in detail.

Referring to FIGS. 2 and 3, the present cooling system includes an introduction duct 20 through which the air existing in a passenger compartment is introduced into the battery storage room 3a. The introduction duct 20 has an internal passageway 22 with an inlet 24 and an outlet 25. The inlet 24 is opened to the passenger compartment and the outlet 25 is in communication with the battery storage room 3a of the battery case 3.

The introduction duct 20 configured as above is used to draw the air from the passenger compartment and then lead the air thus drawn to the battery storage room 3a. Thus, the battery 8 in the battery storage room 3a is cooled by the air that has been introduced into the battery storage room 3a.

Referring to FIG. 3, the present cooling system further includes a first supply duct 30 and a second supply duct 40 communicating with the battery storage room 3a. The first supply duct 30 extends along the top surface of the DC-DC converter 12 and has an internal passageway 32 through which the air is introduced from the battery storage room 3a and then supplied to the top surface of the DC-DC converter 12. In a nutshell, the first supply duct 30 is used to feed the air in the battery storage room 3a to the top surface of the DC-DC converter 12, thereby cooling the DC-DC converter 12.

Figure 4:
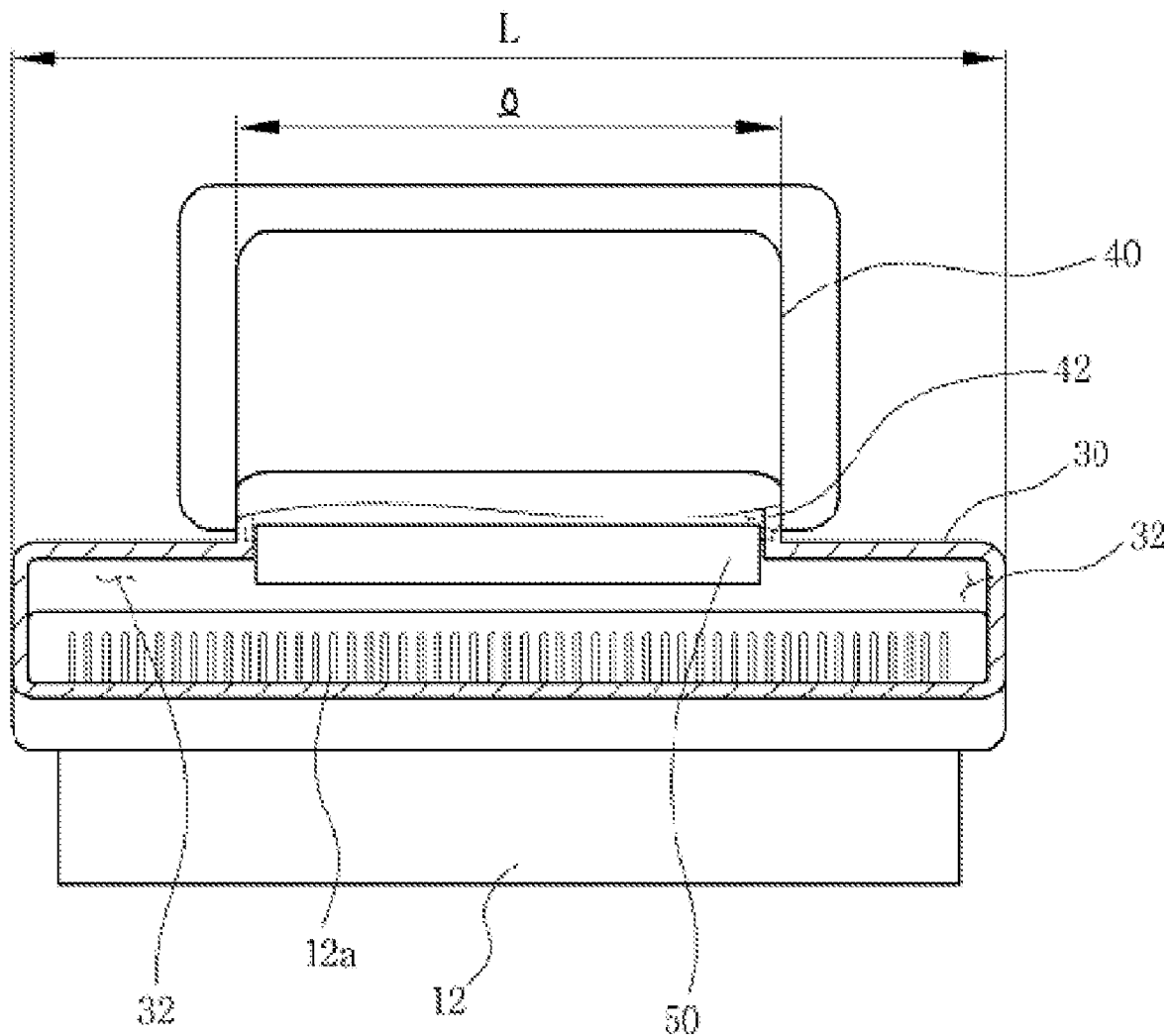
FIG. 4 is a sectional view taken along line IV-IV in FIG. 3.

On the top surface of the DC-DC converter 12, there is provided a plurality of cooling fins 12a protruding into the internal passageway 32 of the first supply duct 30 (see FIG. 4). The cooling fins 12a serve to increase the contact area of the air flowing through the internal passageway 32, thus enhancing the cooling efficiency for the DC-DC converter 12. The cooling fins 12a are oriented in parallel with the flow direction of the air so as not to hinder the air flow through the internal passageway 32.

As shown in FIG. 3, the second supply duct 40 extends along the bottom surface of the motor control unit 10 and has an internal passageway 42 through which the air is introduced from the battery storage room 3a and then supplied to the bottom surface of the motor control unit 10. In a nutshell, the second supply duct 40 is used to feed the air in the battery storage room 3a to the bottom surface of the motor control unit 10, thereby cooling the motor control unit 10. The second supply duct 40 is branched off from the first supply duct 30 in such a manner that a part of the air heading for the first supply duct 30 is bypassed into the second supply duct 40 and then supplied to the bottom surface of the motor control unit 10.

The reason for making the second supply duct 40 branched off from the first supply duct 30 is that, in case the first supply duct 30 and the second supply duct 40 would be independently bifurcated from the battery storage room 3a, the quantity of air introduced into the respective ducts 30 and 40 may vary with the air flow fluctuation in the battery storage room 3a, which in turn makes it difficult to control the quantity of air introduced into the respective ducts 30 and 40.

If the second supply duct 40 is branched off from the first supply duct 30 as in the illustrated embodiment, the air introduced into the first supply duct 30 is partly bypassed toward the second supply duct 40. Not only does this make it possible to uniformly distribute the air but also make it easy to control the quantity of air introduced into the respective ducts 30 and 40 merely by changing the structure by which the air is distributed.

Alternatively, the second supply duct 40 may be directly connected to the battery storage room 3a, while the first supply duct 30 is branched off from the second supply duct 40.

As can be seen in FIG. 4, the second supply duct 40 is branched off from the center portion of the first supply duct 30 such that the width "l" of the second supply duct 40 becomes smaller than the width "L" of the first supply duct 30.

Referring again to FIG. 3, the present cooling system further includes an air distributor means for distributing the air flowing out from the battery storage room 3a to the first supply duct 30 and the second supply duct 40.

The air distributor means includes a distributing door 50 rotatably mounted at a branching point from which the first supply duct 30 and the second supply duct 40 are separated from each other. The distributing door 50 is adapted to rotate between the internal passageway 32 of the first supply duct 30 and the internal passageway 42 of the second supply duct 40, thus regulating the opening degrees of the first supply duct 30 and the second supply duct 40.

By regulating the opening degrees of the first supply duct 30 and the second supply duct 40 in this way, it becomes possible to variably control the quantity of air introduced into the respective ducts 30 and 40, meaning that the air can be suitably distributed to the first supply duct 30 and the second supply duct 40.

Referring again to FIG. 3, the air distributor means further includes a distributing door control means for controlling rotation of the distributing door 50 to ensure that the quantity of air distributed to the first supply duct 30 and the second supply duct 40 can be regulated depending on the degree of overheat of the motor control unit 10 and the DC-DC converter 12.

The distributing door control means includes a first temperature detector 54 for detecting the temperature of the DC-DC converter 12, a second temperature detector 55 for detecting the temperature of the motor control unit 10, a controller 56 for generating a control signal based on detection signals of the first temperature detector 54 and the second temperature detector 55, and an actuator 58 for rotating the distributing door 50 in response to the control signal of the controller 56.

The first temperature detector 54 is formed of a temperature sensor and serves to detect the temperature of the DC-DC converter 12. The second temperature detector 55 is also formed of a temperature sensor and serves to detect the temperature of the motor control unit 10.

The controller 56 is provided with a microprocessor and is adapted to compare the temperature of the DC-DC converter 12 inputted from the first temperature detector 54 with a predetermined reference temperature. If the result of comparison reveals that the temperature of the DC-DC converter 12 is higher than the predetermined reference temperature, the controller 56 judges the DC-DC converter 12 to be in an overheated condition and generates a first control signal.

Furthermore, the controller 56 is adapted to compare the temperature of the motor control unit 10 inputted from the second temperature detector 55 with a predetermined reference temperature. If the result of comparison shows that the temperature of the motor control unit 10 is higher than the predetermined reference temperature, the controller 56 judges the motor control unit 10 to be in an overheated condition and generates a second control signal.

Responsive to the first control signal generated by the controller 56, the actuator 58 causes the distributing door 50 to rotate toward the second supply duct 40, i.e., in such a direction as to reduce the opening degree of the second supply duct 40. This reduces the quantity of air introduced into the second supply duct 40 but increases the quantity of air flowing through the first supply duct 30, whereby a large quantity of air is introduced into the first supply duct 30 to enhance the cooling of the overheated DC-DC converter 12.

Likewise, in response to the second control signal generated by the controller 56, the actuator 58 causes the distributing door 50 to rotate toward the first supply duct 30, i.e., in such a direction as to reduce the opening degree of the first supply duct 30. This reduces the quantity of air introduced into the first supply duct 30 but increases the quantity of air flowing through the second supply duct 40, whereby a large quantity of air is introduced into the second supply duct 40 to enhance the cooling of the overheated motor control unit 10.

With the distributing door control means as constructed above, it is possible to efficiently cool the DC-DC converter 12 and the motor control unit 10 by detecting occurrence of overheating in the DC-DC converter 12 and the motor control unit 10 and supplying an increased quantity of air to one of the DC-DC converter 12 and the motor control unit 10, whichever remains in an overheated condition.

Figure 5:
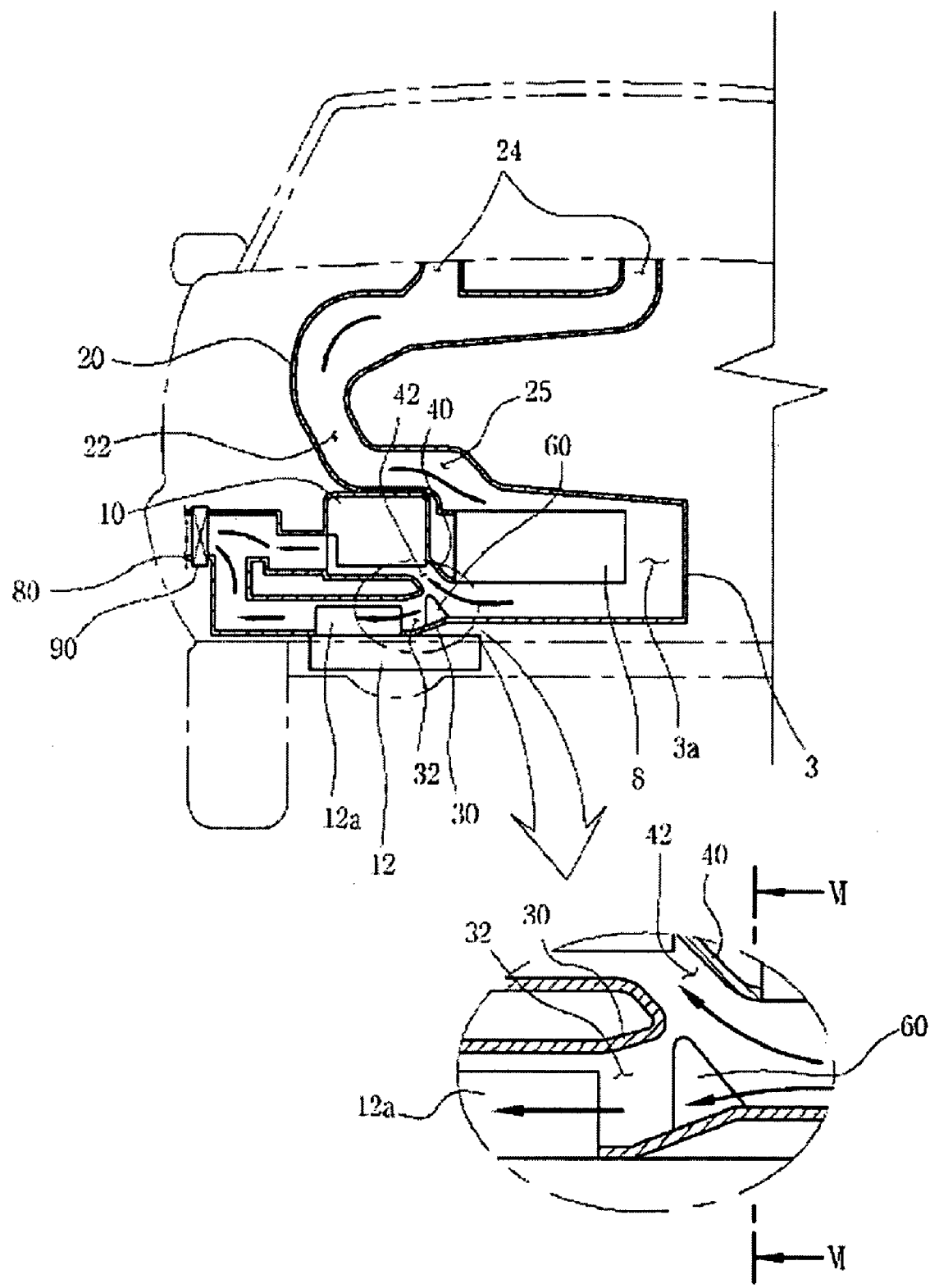
FIG. 5 is a sectional view illustrating a second embodiment of an air distributor means that forms a part of the present cooling system.
Figure 6:
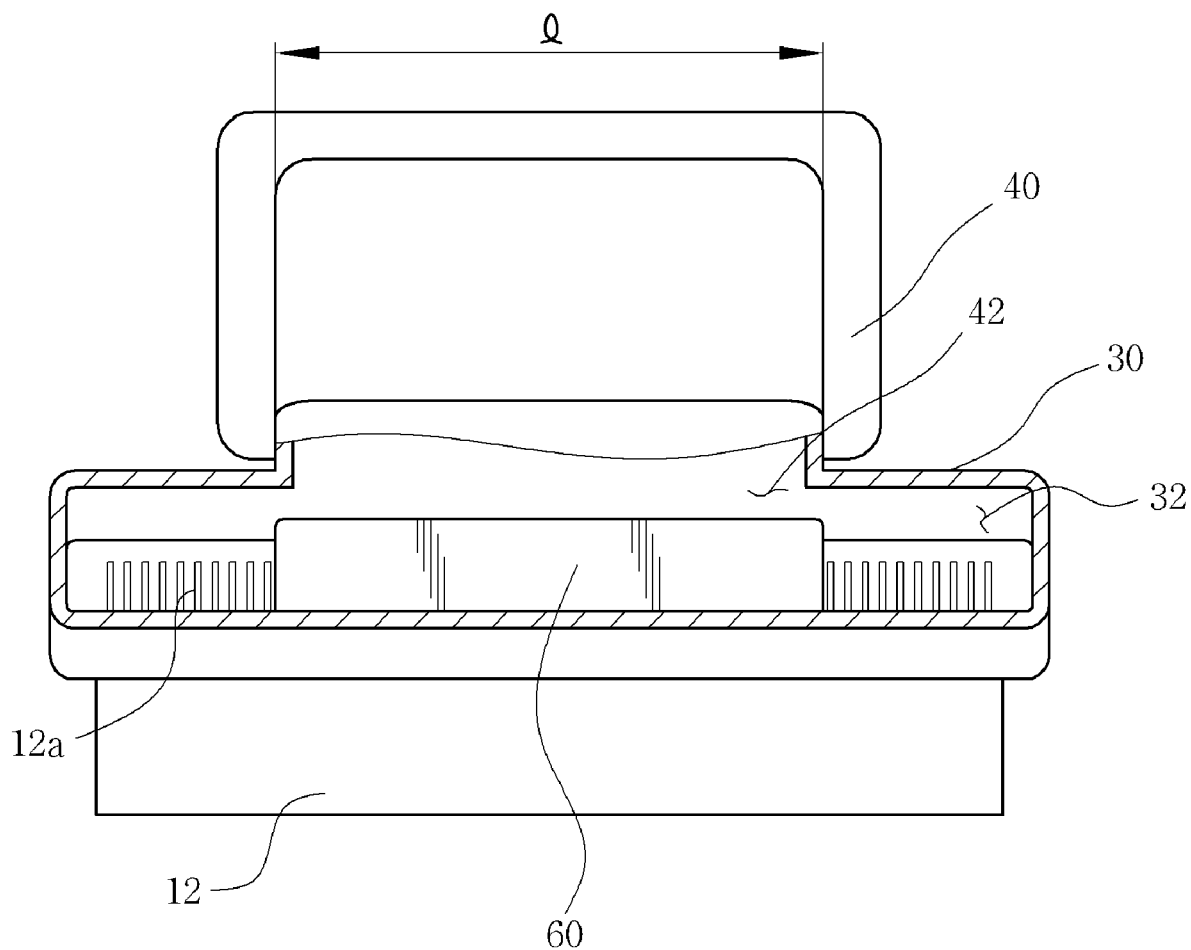
FIG. 6 is a sectional view taken along line VI-VI in FIG. 5.
Figure 7:
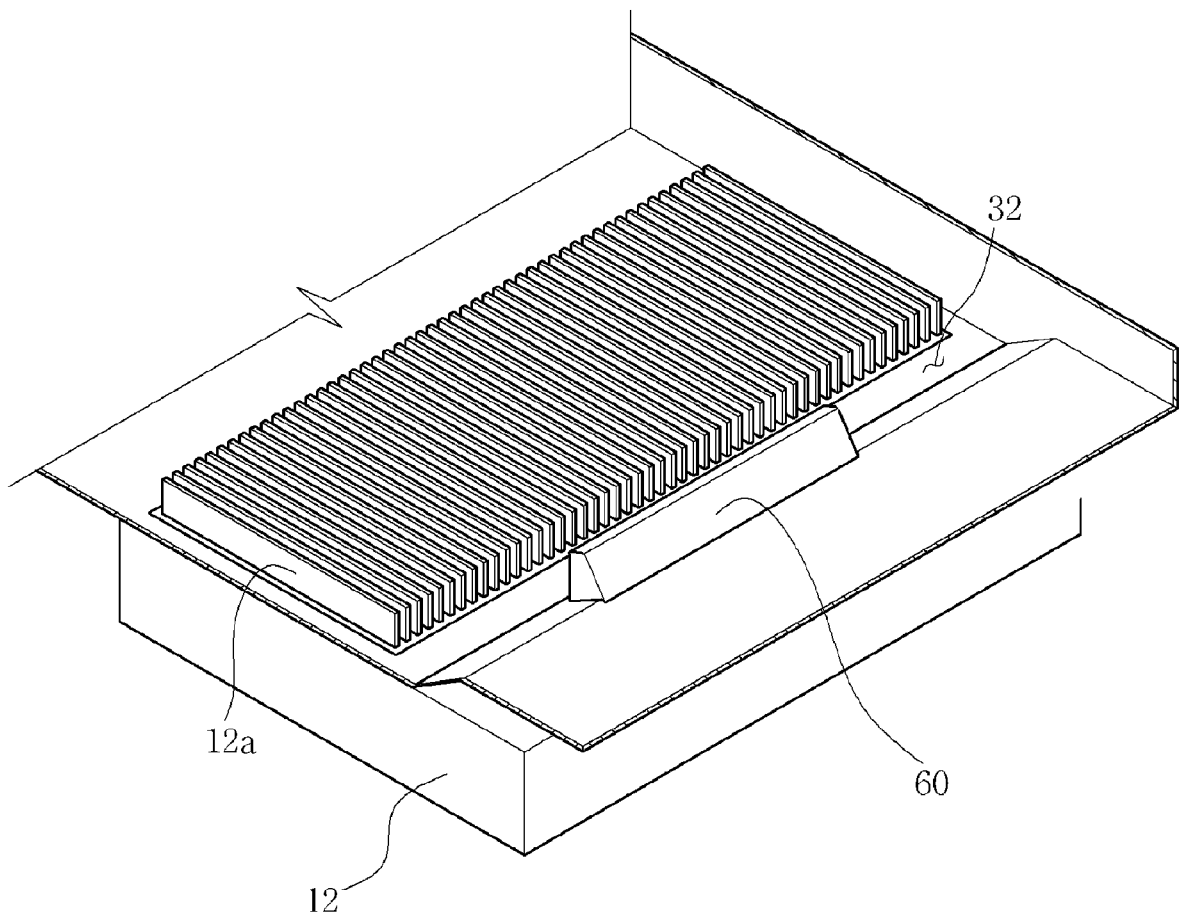
FIG. 7 is a perspective view showing a guide baffle that forms a part of the air distributor means of the second embodiment.

Referring next to FIGS. 5 through 7, there is illustrated a second embodiment of the air distributor means. The air distributor means in accordance with the second embodiment is provided with a guide baffle 60 extending from the bottom surface of the internal passageway 32 of the first supply duct 30 toward the internal passageway 42 of the second supply duct 40. The guide baffle 60 is a protrusion having a generally triangular shape and serves to guide the air flowing through the first supply duct 30 to the internal passageway 42 of the second supply duct 40.

By guiding the air in the first supply duct 30 to the second supply duct 40, the guide baffle 60 helps the air to be bypassed from the first supply duct 30 to the second supply duct 40. This ensures that a large quantity of air is distributed to the second supply duct 40, thus making it possible to efficiently cool the bottom surface of the motor control unit 10.

The guide baffle 60 may be integrally formed with the first supply duct 30 or may be separately manufactured and then attached to the first supply duct 30, although the former method is preferable. As can be seen in FIG. 6, the guide baffle 60 is formed in alignment with the second supply duct 40 and has a transverse length substantially equal to the width "l" of the second supply duct 40.

Figure 8:
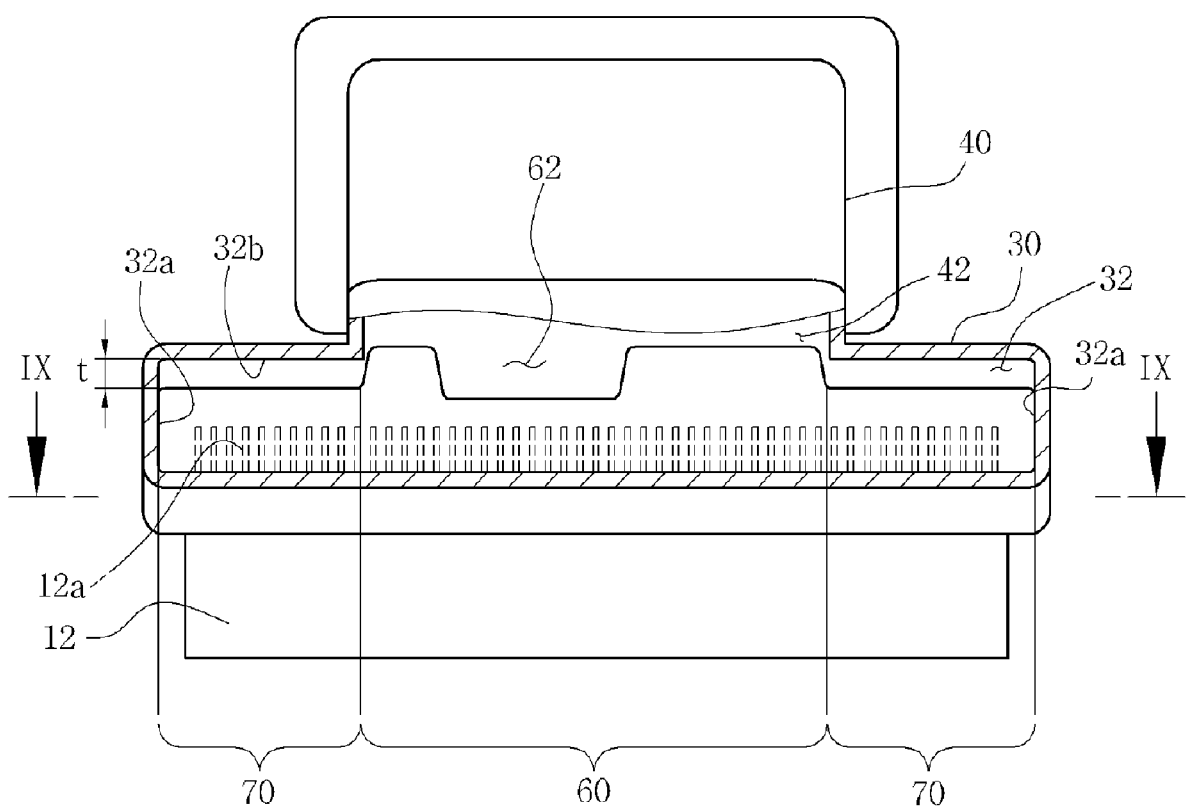
FIG. 8 is a sectional view illustrating a third embodiment of an air distributor means that forms a part of the present cooling system.
Figure 9:
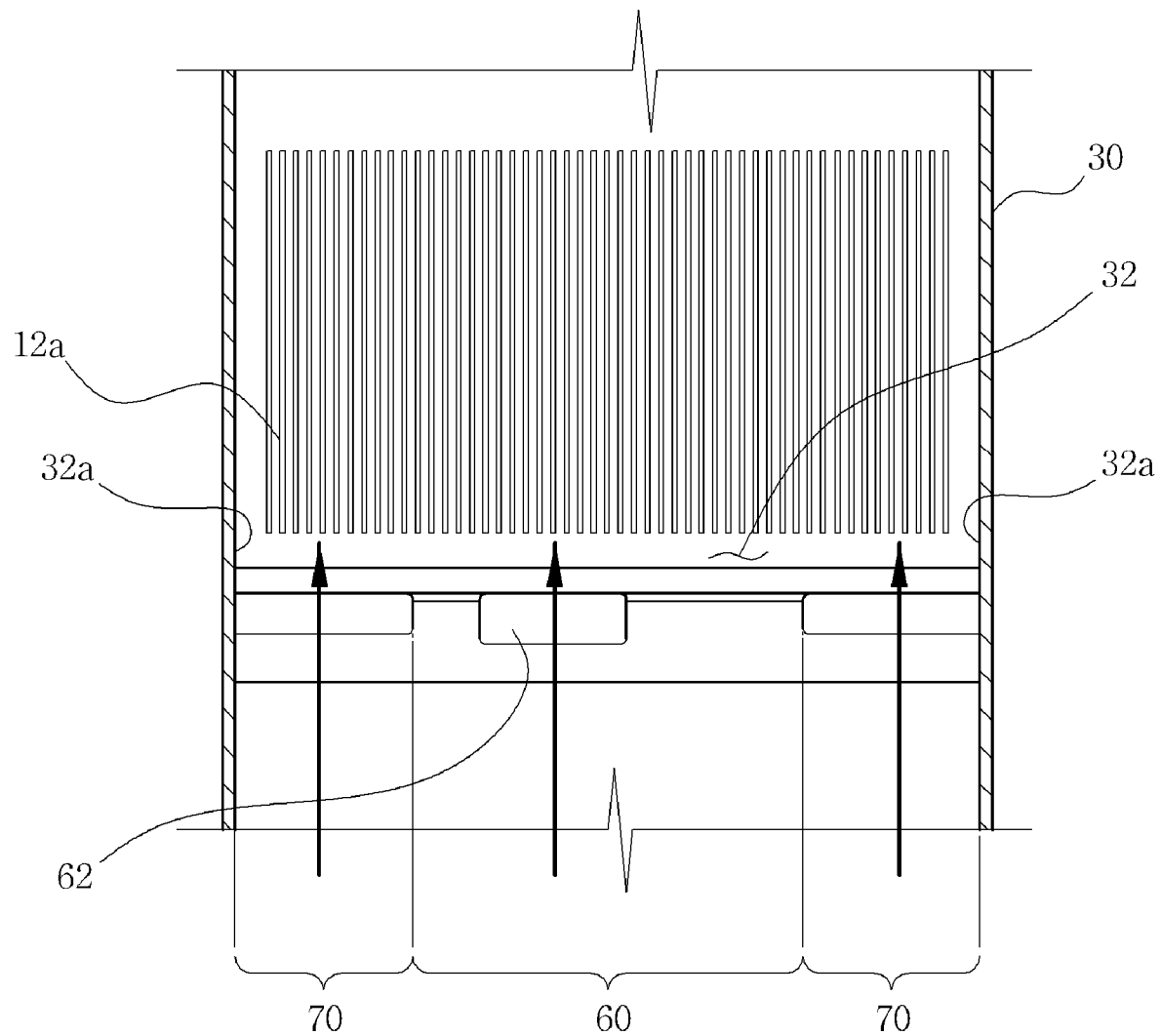
FIG. 9 is a sectional view taken along line IX-IX in FIG. 8.
Figure 10:
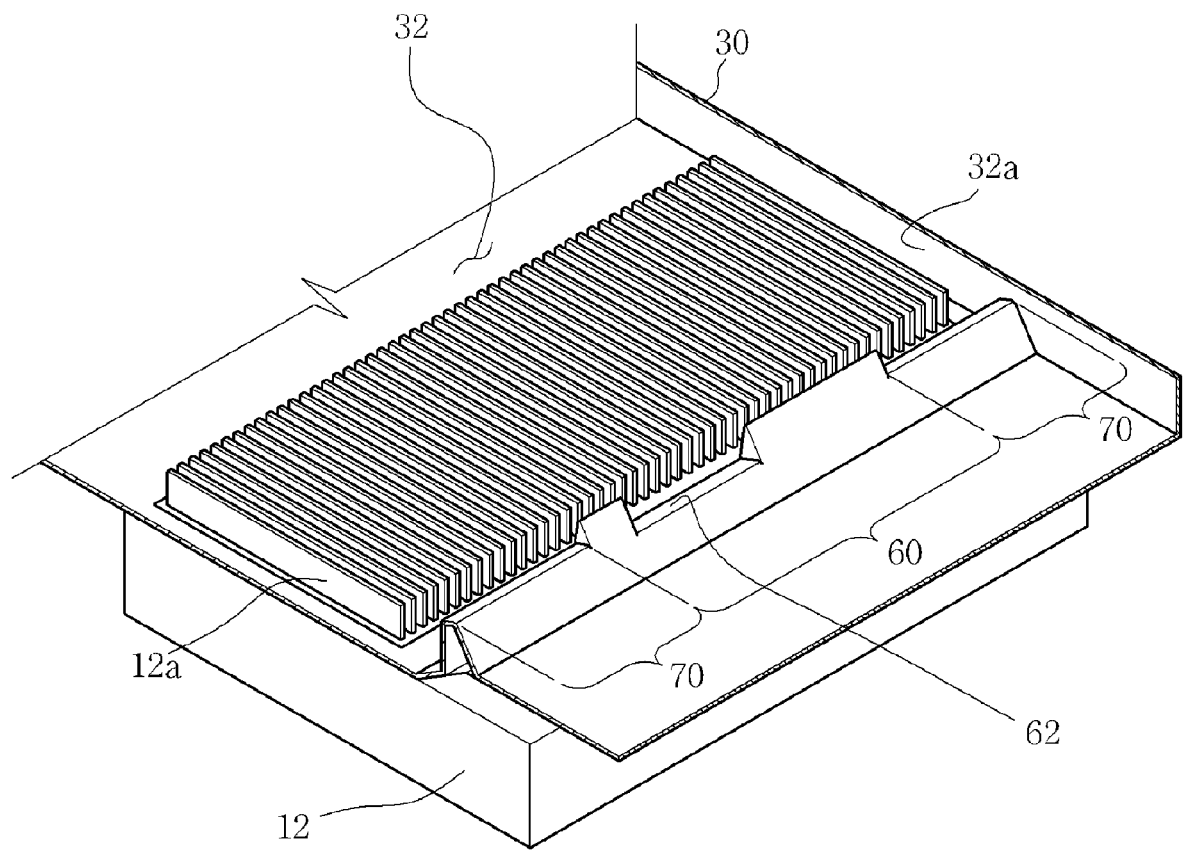
FIG. 10 is a perspective view showing a guide baffle and dispersion baffles that form a part of the air distributor means of the third embodiment.

Referring next to FIGS. 8 through 10, there is illustrated a third embodiment of the air distributor means. As with the guide baffle 60 of the second embodiment, the air distributor means in accordance with the third embodiment is provided with a guide baffle 60 for guiding the air flowing through the first supply duct 30 to the second supply duct 40.

The guide baffle 60 protrudes toward the internal passageway 42 of the second supply duct 40 with a transverse length corresponding to the width of the second supply duct 40. The guide baffle 60 helps the air to be bypassed from the first supply duct 30 to the second supply duct 40. This ensures that a large quantity of air is distributed to the second supply duct 40.

The guide baffle 60 is provided at its top end with an air passage cutout 62 of a predetermined width. The air passage cutout 62 allows the air flowing through the first supply duct 30 to move toward the DC-DC converter 12. This enables the air to be supplied to the cooling fins 12a of the DC-DC converter 12 lying behind of the guide baffle 60, thereby ensuring that the cooling fins 12a of the DC-DC converter 12 are cooled uniformly in their entirety.

Other portions of the guide baffle 60 except the air passage cutout 62 are tall enough to protrude into the internal passageway 42 of the second supply duct 40. Thus, a large quantity of air is bypassed to the second supply duct 40. The reason for forming the guide baffle 60 in this shape is to compensate the reduction in the quantity of air bypassed to the second supply duct 40, which would be caused by the presence of the air passage cutout 62.

Referring again to FIGS. 8 through 10, the air distributor means of the third embodiment further includes dispersion baffles 70 formed on opposite lateral sides of the guide baffle 60. The dispersion baffles 70 extend from the opposite lateral sides of the guide baffle 60 up to side walls 32a of the internal passageway 32 of the first supply duct 30 beyond the opposite side edges of the DC-DC converter 12.

The dispersion baffles 70 are smaller in height than the guide baffle 60 such that, as illustrated in FIG. 8, a relatively wide gap "t" can be left between the dispersion baffles 70 and the ceiling wall 32b of the internal passageway 32 of the first supply duct 30.

The dispersion baffles 70 serve to block up the air flowing through the first supply duct 30 and disperse it in a transverse direction. This allows the air flowing through the first supply duct 30 to be distributed with a uniform flow rate and an even pressure distribution, thereby uniformly cooling the cooling fins 12a of the DC-DC converter 12.

Inasmuch as the dispersion baffles 70 extend in a transverse direction beyond the opposite side edges of the DC-DC converter 12, the air flowing through the first supply duct 30 is prevented from converging on opposite side edges of the DC-DC converter 12. This helps to reduce the quantity of air that passes the lateral channels formed between the outermost cooling fins 12a of the DC-DC converter 12 and the side walls 32a of the first supply duct 30.

With the air distributor means of the third embodiment by which the air flowing through the first supply duct 30 is dispersed in a transverse direction, it becomes possible to uniformly distribute the air over the whole cross section of the internal passageway 32 of the first supply duct 30. This makes it possible to uniformly cool the cooling fins 12a of the DC-DC converter 12.

Moreover, because the air distributor means has a structure capable of supplying the air to the cooling fins 12a arranged just behind of the guide baffle 60, it is possible to maximize the cooling efficiency of the DC-DC converter 12.

In an effort to verify the cooling efficiency for the motor control unit 10 and the DC-DC converter 12 attained by the air distributor means of the third embodiment, a test was conducted to measure air stream distribution ratios, i.e., ratios of the air distributed to the motor control unit 10, the cooling fins 12a of the DC-DC converter 12 and the lateral channels alongside the outermost cooling fins 12a of the DC-DC converter 12, respectively. The results of measurement are shown in Table 1 below.

TABLE 1

| Areas Measured | Air Stream Distribution Ratios (%) |
|---|---|
| Motor Control Unit | 34.7% |
| Cooling Fins of DC-DC Converter | 30.8% |
| Lateral Channels alongside cooling fins | 34.5% |

Table 1 reveals that, based on the total air stream amount, the air stream distribution ratios are about 34.7% in the motor control unit 10, about 30.8% in the cooling fins 12a of the DC-DC converter 12 and about 34.5% in the lateral channels alongside the outermost cooling fins 12a of the DC-DC converter 12.

This means that the air distributor means of the third embodiment is able to substantially uniformly distribute the air flowing through the first supply duct 30 to the motor control unit 10, the cooling fins 12a of the DC-DC converter 12 and the lateral channels alongside the outermost cooling fins 12a of the DC-DC converter 12, thereby improving the cooling efficiency for the motor control unit 10 and the DC-DC converter 12.

Figure 11:
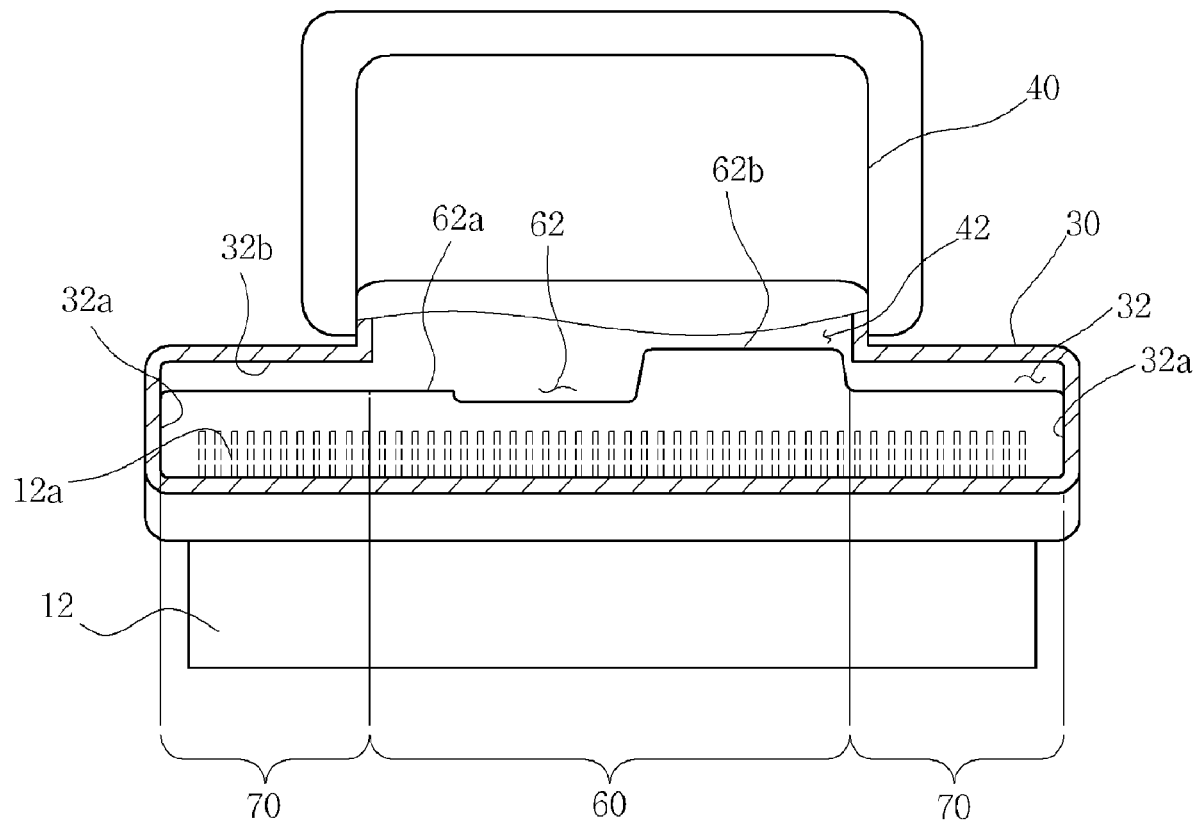
FIG. 11 is a sectional view illustrating a modified example of the guide baffle employed in the air distributor means of the third embodiment.
Figure 12:
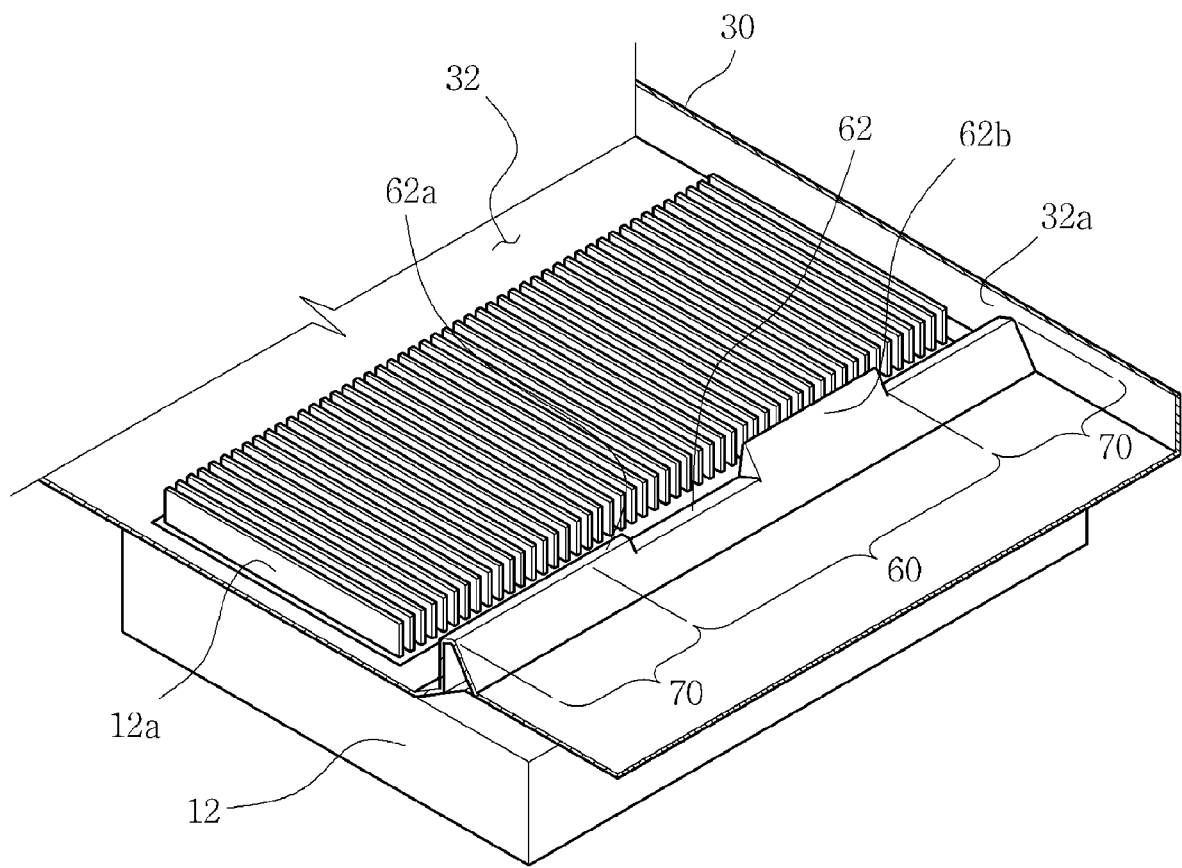
FIG. 12 is a perspective view illustrating the modified example of the guide baffle employed in the air distributor means of the third embodiment.

Referring to FIGS. 11 and 12, there is shown a modified example of the guide baffle 60 employed in the air distributor means of the third embodiment.

The guide baffle 60 of this modified example has an air passage cutout 62 and two side portions 62a and 62b, one of which has the same height as that of the dispersion baffles 70. In other respects, the guide baffle 60 of this modified example is identical with the guide baffle 60 of the third embodiment set forth above.

With the guide baffle 60 of this modified example, since one side portion 62a has the same height as that of the dispersion baffles 70 and is shorter in height than the other side portion 62b, it is possible to reduce the quantity of air bypassed from the first supply duct 30 to the second supply duct 40.

Furthermore, due to the fact that one side portion 62a of the guide baffle 60 has a shorter height than the other side portion 62b, a large quantity of air can be supplied to the cooling fins 12a of the DC-DC converter 12 lying behind the guide baffle 60, thereby making it possible to enhance the cooling efficiency of the DC-DC converter 12.

Referring again to FIG. 3, the present cooling system further includes an exhaust duct 80 connected to the first supply duct 30 and the second supply duct 40. The exhaust duct 80 communicates with the internal passageways 32 and 42 of the first supply duct 30 and the second supply duct 40 and allows the air flowing through the first supply duct 30 and the second supply duct 40 to be discharged to the outside of the vehicle therethrough. In other words, the air used in cooling the DC-DC converter 12 and the motor control unit 10 is discharged to the outside of the vehicle through the exhaust duct 80.

The present cooling system further includes a blower 90 provided in the exhaust duct 80. The blower 90 is operated by an electric power applied thereto to draw the air in the exhaust duct 80. This makes it possible to draw the air existing in the passenger compartment through the introduction duct 20 which is connected to the exhaust duct 80 via the first supply duct 30 and the second supply duct 40.

Although the blower 90 is mounted to the exhaust duct 80 in the illustrated embodiment, it may be installed in the introduction duct 20 in other embodiments.

As described herein above, the cooling system for hybrid vehicles in accordance with the present invention is of a structure capable of simultaneously cooling a battery, a motor control unit and a DC-DC converter all together by use of an air introduced. This eliminates the need to employ separate cooling devices for independently cooling the battery, the motor control unit and the DC-DC converter. Accordingly, it is possible to minimize the number of components required, while enjoying a simplified structure and reduced production costs.

Furthermore, because the air used in cooling the battery is uniformly distributed to the motor control unit and the DC-DC converter, it is possible to increase the cooling efficiency for the motor control unit and the DC-DC converter.

Moreover, the cooling efficiency for the motor control unit and the DC-DC converter can be maximized, because the quantity of air distributed to the motor control unit and the DC-DC converter is arbitrarily controllable depending on the degree of overheat of the motor control unit and the DC-DC converter.

In addition, since the air supplied to the DC-DC converter has a uniform flow rate and an even pressure distribution, there is provided an advantageous effect that the DC-DC converter can be cooled in an efficient manner.

While the invention has been described in respect of a preferred embodiment, it will be understood by those skilled in the art that the present invention is not limited to the foregoing embodiment but various changes and modifications may be made without departing from the scope of the invention as defined in the claims.

What is claimed is:

1. A cooling system arranged in a rear part of a hybrid vehicle, the hybrid vehicle being equipped with an electric motor and an internal combustion engine in combination, the cooling system comprising:

a battery case with a battery storage room for receiving a battery, the battery supplying power to the electric motor of the hybrid vehicle;

a motor control unit for controlling the electric motor and a converter for converting a voltage of the battery;

a blower for drawing an air existing in a passenger compartment of the hybrid vehicle;

an introduction duct through which the air drawn by the blower is introduced into the battery storage room to cool the battery;

a first supply duct having an internal passageway through which the air flowing out of the battery storage room is supplied to the converter to cool the converter;

a second supply duct having an internal passageway through which the air flowing out of the battery storage room is supplied to the motor control unit to cool the motor control unit; and an air distributor means for distributing the air flowing out of the battery storage room to the first supply duct and the second supply duct wherein the air distributor means comprises a guide baffle extending from the internal passageway of the first supply duct toward the internal passageway of the second supply duct for guiding a part of the air introduced into the first supply duct to the second supply duct, and further comprises dispersion baffles extending from the guide baffle toward opposite side walls of the first supply duct in such a manner as to disperse the air flowing through the first supply duct in a transverse direction; and wherein the converter is provided with a plurality of cooling fins protruding into the internal passageway of the first supply duct and arranged just behind the guide baffle.

2. The cooling system as recited in claim 1, wherein the dispersion baffles are formed in a smaller height than the guide baffle.

3. The cooling system as recited in claim 1, wherein the guide baffle extends into the internal passageway of the second supply duct.

4. The cooling system as recited in claim 1, wherein the guide baffle is provided with an air passage cutout through which the air in the first supply duct is allowed to flow toward the converter in the first supply duct and the plurality of cooling fins arranged in the first supply duct just behind the guide baffle.

5. The cooling system as recited in claim 1, wherein the guide baffle and the dispersion baffles are integrally formed with the first supply duct.

6. The cooling system as recited in claim 1, wherein the guide baffle and the dispersion baffles are separately manufactured and attached to the first supply duct.

7. The cooling system as recited in claim 1, wherein the first supply duct is adapted to supply the air in the battery storage room to a top surface of the converter.

8. The cooling system as recited in claim 1, wherein the second supply duct is adapted to supply the air in the battery storage room to a bottom surface of the motor control unit.

9. The cooling system as recited in claim 1, wherein the first supply duct is directly connected to the battery storage room and the second supply duct is branched off from the first supply duct.

10. The cooling system as recited in claim 1, wherein the second supply duct is directly connected to the battery storage room and the first supply duct is branched off from the second supply duct.

* * * * *